(12) United States Patent
Yamada et al.

(10) Patent No.: US 11,912,217 B2
(45) Date of Patent: Feb. 27, 2024

(54) VEHICLE

(71) Applicant: TOYOTA JIDOSHA KABUSHIKI KAISHA, Toyota (JP)

(72) Inventors: Koushi Yamada, Odawara (JP); Junichi Sudo, Fujisawa (JP); Kenichiro Sakurai, Nagakute (JP); Kazuhiro Maeda, Susono (JP); Toshio Tanahashi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/174,032

(22) Filed: Feb. 24, 2023

(65) Prior Publication Data

US 2023/0356679 A1 Nov. 9, 2023

(30) Foreign Application Priority Data

May 9, 2022 (JP) .................................. 2022-076872

(51) Int. Cl.
*B60R 16/06* (2006.01)

(52) U.S. Cl.
CPC .................................. *B60R 16/06* (2013.01)

(58) Field of Classification Search
CPC ...................................................... B60R 16/06
USPC .................................................... 361/56, 216
See application file for complete search history.

(56) References Cited

U.S. PATENT DOCUMENTS

| | | | |
|---|---|---|---|
| 2016/0200270 A1* | 7/2016 | Tanahashi | H05K 7/1432 361/216 |
| 2016/0280162 A1* | 9/2016 | Yamada | B62D 35/00 |
| 2018/0001851 A1 | 1/2018 | Tanahashi et al. | |
| 2018/0001852 A1 | 1/2018 | Tanahashi et al. | |

FOREIGN PATENT DOCUMENTS

| | | | | |
|---|---|---|---|---|
| CN | 209090624 U | * | 7/2019 | ........... A47G 9/0238 |
| EP | 3 064 416 A1 | | 9/2016 | |
| JP | 05062657 A | * | 3/1993 | |

(Continued)

OTHER PUBLICATIONS

Machine translation of Sun Chinese Patent Document CN 209090624 U Jul. 2019 (Year: 2019).*

(Continued)

*Primary Examiner* — Kevin J Comber
(74) *Attorney, Agent, or Firm* — Oliff PLC (57) ABSTRACT

A vehicle is positively charged with static electricity due to an external factor. The vehicle includes a battery, a static eliminator sheet, and a holding member. The battery includes at least one cell, an electrolyte, a resin case, and negative and positive terminals. The resin case accommodates the components and electrolyte of each cell. The negative terminal is grounded to the vehicle body. The positive terminal is supplied with electric power from a charger. The static eliminator sheet is made of a material on a positive side of a triboelectric series with respect to a material of the resin case. The holding member holds the static eliminator sheet and the resin case in contact with each other. The holding member holds the battery at a predetermined location of the vehicle body in a state where the resin case and the static eliminator sheet are slidable due to vehicle body vibrations.

10 Claims, 9 Drawing Sheets

(56) References Cited

FOREIGN PATENT DOCUMENTS

| JP | 2005158264 A | * | 6/2005 |
|---|---|---|---|
| JP | 6168157 B2 | | 7/2017 |
| KR | 183228 B1 | * | 5/1999 |
| WO | 2015/064195 A1 | | 5/2015 |

OTHER PUBLICATIONS

Machine translation of Hasegawa et al. Japanese Patent Document JP H05-62657 A Sep. 1991 (Year: 1991).*
Machine translation of Nemoto et al. Japanese Patent Document JP 2005-158264 A Sep. 2003 (Year: 2003).*
Machine translation of Kwon Korean Patent Document KR 10-0183228 B1 Oct. 1996 (Year: 1996).*

* cited by examiner

VEHICLE

CROSS-REFERENCE TO RELATED APPLICATION

This application claims priority to Japanese Patent Application No. 2022-076872 filed on May 9, 2022, incorporated herein by reference in its entirety.

BACKGROUND

1. Technical Field

The disclosure relates to a vehicle including an auxiliary battery.

2. Description of Related Art

There is known an disclosure that relates to a vehicle capable of suppressing separation of positively charged air flow from the outer surface of a vehicle body due to the positive charge of the vehicle body. As described in, for example, WO 2015/064195, in the vehicle, the vehicle body kept electrically insulated from a road is positively charged with static electricity due to external factors including running of the vehicle (see Abstract, Paragraph 0008, claim 1, and the like in WO 2015/064195).

The vehicle described in WO 2015/064195 includes a self-discharge static eliminator that reduces the positive potential of a specified portion by neutralizing and eliminating the positive potential through self discharge producing negative air ions according to the positive potential. Here, the specified portion is at least any one of the points of a separation shape in which positively charged air flow flowing around a vehicle body during running begins to change from a flow along the surface of the charged vehicle body to a flow spaced apart from the surface.

With the vehicle described in WO 2015/064195, the positive potential is reduced by reducing the static electricity charged on the surface of the vehicle body, so a repulsion force generated between the surface of the vehicle body and the positively charged air flow is reduced. Therefore, separation of the positively charged air flow from near the surface of the vehicle body is suppressed. As a result, an unexpected change in air pressure applied to the surface of the vehicle body and deterioration of aerodynamic characteristics of the vehicle body accordingly are suppressed, so a decrease in running performance such as handling stability is suppressed (see Paragraph 0021 and the like in WO 2015/064195).

SUMMARY

The vehicle is capable of reducing the positive potential by reducing static electricity charged on the surface of the vehicle body; however, a resin case of an auxiliary battery held on the vehicle body is still charged with a positive potential. When the case of the auxiliary battery is electrically charged, stirring of an electrolyte between a positive plate and a negative plate that make up each individual cell and that are accommodated in the case is impaired and, as a result, a stratification phenomenon occurs. Thus, the deterioration of the auxiliary battery advances, so the original performance of the auxiliary battery may be not exercised.

The disclosure provides a vehicle capable of suppressing a stratification phenomenon by facilitating stirring of an electrolyte between a positive plate and a negative plate that make up each individual cell and that are accommodated in a resin case of a battery to supply electric power to auxiliaries of the vehicle and exercising the original performance of the battery by suppressing the degradation of the battery.

An aspect of the disclosure provides a vehicle. The vehicle is positively charged with static electricity due to an external factor including running of a vehicle body kept electrically insulated from a road. The vehicle includes at least one cell including a positive plate and a negative plate opposed via a separator, an electrolyte, a resin case accommodating the at least one cell and the electrolyte, a negative terminal provided on the resin case so as to be connected to the negative plate and grounded to the vehicle body, and a positive terminal provided on the resin case so as to be connected to the positive plate and configured to supply electric power from a charger of the vehicle, the battery being configured to supply electric power to an auxiliary of the vehicle from the positive terminal, a static eliminator sheet made of a material on a positive side of a triboelectric series with respect to a material of the resin case, and a holding member holding the static eliminator sheet and the resin case in contact with each other and holding the battery at a predetermined location of the vehicle body in a state where the resin case and the static eliminator sheet are slidable due to vibrations of the vehicle body.

According to the aspect of the disclosure, if the vehicle body vibrates due to the unevenness of a road, the vibrations of an engine, or the like during running of the vehicle, the resin case of the battery and the static eliminator sheet, held slidable and in contact with each other by the holding member, slide on each other. The static eliminator sheet is made of a material on the positive side of the triboelectric series with respect to the material of the resin case of the battery. Therefore, electrons with negative charge resulting from friction during sliding between the resin case of the battery and the static eliminator sheet transfer from the static eliminator sheet to the resin case of the battery. As a result, the resin case of the battery, which is mounted on the vehicle that is positively charged with static electricity due to an external factor and is positively charged when there is no static eliminator sheet, is diselectrified to approach a zero potential. Thus, it is possible to suppress a stratification phenomenon by facilitating stirring of the electrolyte between the positive plate and the negative plate that make up each individual cell and that are accommodated in the resin case of the battery to suppress the degradation of the battery.

In the vehicle according to the aspect of the disclosure, the battery may have a cell structure in which the three or more cells are connected in series, and the holding member may hold the resin case and the static eliminator sheet in a state where part of an outer surface of the resin case, corresponding to a location of the cell at a center of the cell structure, is in contact with the static eliminator sheet.

With the above configuration, in the battery having a cell structure in which the three or more cells are connected in series, the static eliminator sheet allowed to slide while being in contact with the center of the resin case, corresponding to the location of the cell at the center that is more easily electrically charged. Therefore, the resin case is effectively diselectrified. The outer surface of the resin case with which the static eliminator sheet is in contact is at least one of a top surface, a side surface, and a bottom surface of the resin case.

In the vehicle according to the aspect of the disclosure, the battery may have a cell structure in which the three or more cells are connected in series, and the vehicle may further include a conductor line electrically connecting the static eliminator sheet with part of an outer surface of the resin case, corresponding to a location of the cell at a center of the cell structure.

With the above configuration, electrons that transfer from the static eliminator sheet to the resin case due to friction during sliding between the static eliminator sheet and the resin case are supplied via the conductor line to the surface of the resin case spaced apart from the static eliminator sheet. Thus, the center of the resin case that is spaced apart from the static eliminator sheet and easily electrically charged is caused to approach a zero potential by dielectrifying positive charge. Therefore, it is possible to suppress a stratification phenomenon by facilitating stirring of the electrolyte between the positive plate and the negative plate that are accommodated in the resin case and that are opposed via the separator to suppress the degradation of the battery. The outer surface of the resin case to which the conductor line is connected is at least one of a top surface, a side surface, and a bottom surface of the resin case.

In the vehicle according to the aspect of the disclosure, the static eliminator sheet may have a woven fabric or nonwoven fabric made from fibers of the material on the positive side of the triboelectric series with respect to the material of the resin case.

With the above configuration, it is possible to impart flexibility and elasticity to the static eliminator sheet and to provide the static eliminator sheet with good slidability against the surface of the resin case. Thus, the holding member is capable of holding the static eliminator sheet with the resin case in an elastically compressed state, so it is possible to hold the battery at the predetermined location of the vehicle body in a state where the static eliminator sheet and the resin case are slidable and in contact with each other.

In the above configuration, the static eliminator sheet may be fixed on a battery support surface of the vehicle body, and the battery may be placed on the static eliminator sheet, and a bottom surface of the resin case may be in contact with a top surface of the static eliminator sheet.

With the above configuration, the holding member is capable of holding the static eliminator sheet and the resin case in a state where the top surface of the static eliminator sheet fixed on the battery support surface of the vehicle body is in contact with the bottom surface of the resin case and allowing sliding between the top surface of the static eliminator sheet and the bottom surface of the resin case due to vibrations of the vehicle body. Thus, it is possible to diselectrify positive charge of the resin case by sliding the top surface of the static eliminator sheet on the bottom surface of the resin case during vibrations of the vehicle body to supply electrons from the top surface of the static eliminator sheet to the bottom surface of the resin case and to cause the resin case to approach a zero potential.

In the above configuration, the static eliminator sheet may be disposed on a top surface of the resin case, and the holding member may include a bracket that brings the static eliminator sheet into contact with the top surface of the resin case and that holds the battery between a battery support surface of the vehicle body and the bracket via the static eliminator sheet.

With the above configuration, the holding member is capable of holding the static eliminator sheet and the resin case with the bracket in a state where the static eliminator sheet is in contact with the top surface of the resin case. The bracket holds the battery between the battery support surface of the vehicle body and the bracket via the static eliminator sheet. Thus, it is possible to hold the battery at the predetermined location of the vehicle body in a state where the top surface of the resin case and the static eliminator sheet are slidable on each other due to vibrations of the vehicle body.

In the above configuration, the static eliminator sheet may have a slip resistance on a surface on a side opposite to a surface that is in contact with the resin case.

With the above configuration, it is possible to suppress a relative displacement between the static eliminator sheet and the vehicle body during vibrations of the vehicle body and to further effectively slide the static eliminator sheet and the resin case on each other. Thus, it is possible to further effectively supply electrons from the static eliminator sheet to the resin case of the battery during vibrations of the vehicle body, so it is possible to cause the resin case of the battery, which is positively charged when there is no static eliminator sheet, to approach a zero potential by diselectrifying the resin case.

In the above configuration, the static eliminator sheet may have an elastic sheet and the woven fabric or nonwoven fabric covering a surface of the elastic sheet.

With the above configuration, a flexible woven fabric or nonwoven fabric made of fivers of a material on the positive side of the triboelectric series with respect to the material of the resin case is supported by the elastic sheet having a certain stiffness, with the result that the shape of the static eliminator sheet is stabilized. When the static eliminator sheet and the resin case are held by the holding member in contact with each other, it is possible to elastically deform the elastic sheet between the holding member and the resin case of the battery. Thus, the holding member is capable of holding the battery at the predetermined location of the vehicle body in a state where the woven fabric or nonwoven fabric and the resin case are slidable on each other by pressing the woven fabric or nonwoven fabric covering the surface of the elastic sheet against the resin case with the elastic force of the elastic sheet.

In the above configuration, a material of the elastic sheet may be an antistatic resin.

With the above configuration, electrical charge of the elastic sheet caused by static electricity resulting from friction between the elastic sheet and the woven fabric or nonwoven fabric covering the surface of the elastic sheet is suppressed. Therefore, in a state where the woven fabric or nonwoven fabric covering the surface of the elastic sheet is pressed against the resin case of the battery by the elastic force of the elastic sheet, the woven fabric or nonwoven fabric and the resin case are allowed to slide on each other. Therefore, it is possible to efficiently supply electrons from the woven fabric or nonwoven fabric to the resin case, so it is possible to further efficiently diselectrify the positively charged resin case of the battery when there is no static eliminator sheet and to cause the resin case to approach a zero potential.

In the above configuration, a tape made of a material on a negative side of the triboelectric series with respect to the material of the woven fabric or nonwoven fabric may be attached to the surface of the elastic sheet.

With the above configuration, electrons that occur in the static eliminator sheet increase, and it is possible to further effectively diselectrify the positively charged resin case of the battery and to cause the resin case to approach a zero potential.

According to the aspects of the disclosure, it is possible to provide a vehicle capable of suppressing the degradation of the battery by suppressing a stratification phenomenon by facilitating stirring of the electrolyte between the positive plate and the negative plate that make up each individual cell and that are accommodated in the resin case of the battery to supply electric power to an auxiliary of the vehicle, and exercising the original performance of the battery.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of a vehicle according to the disclosure will be described with reference to the accompanying drawings.

Figure 1:
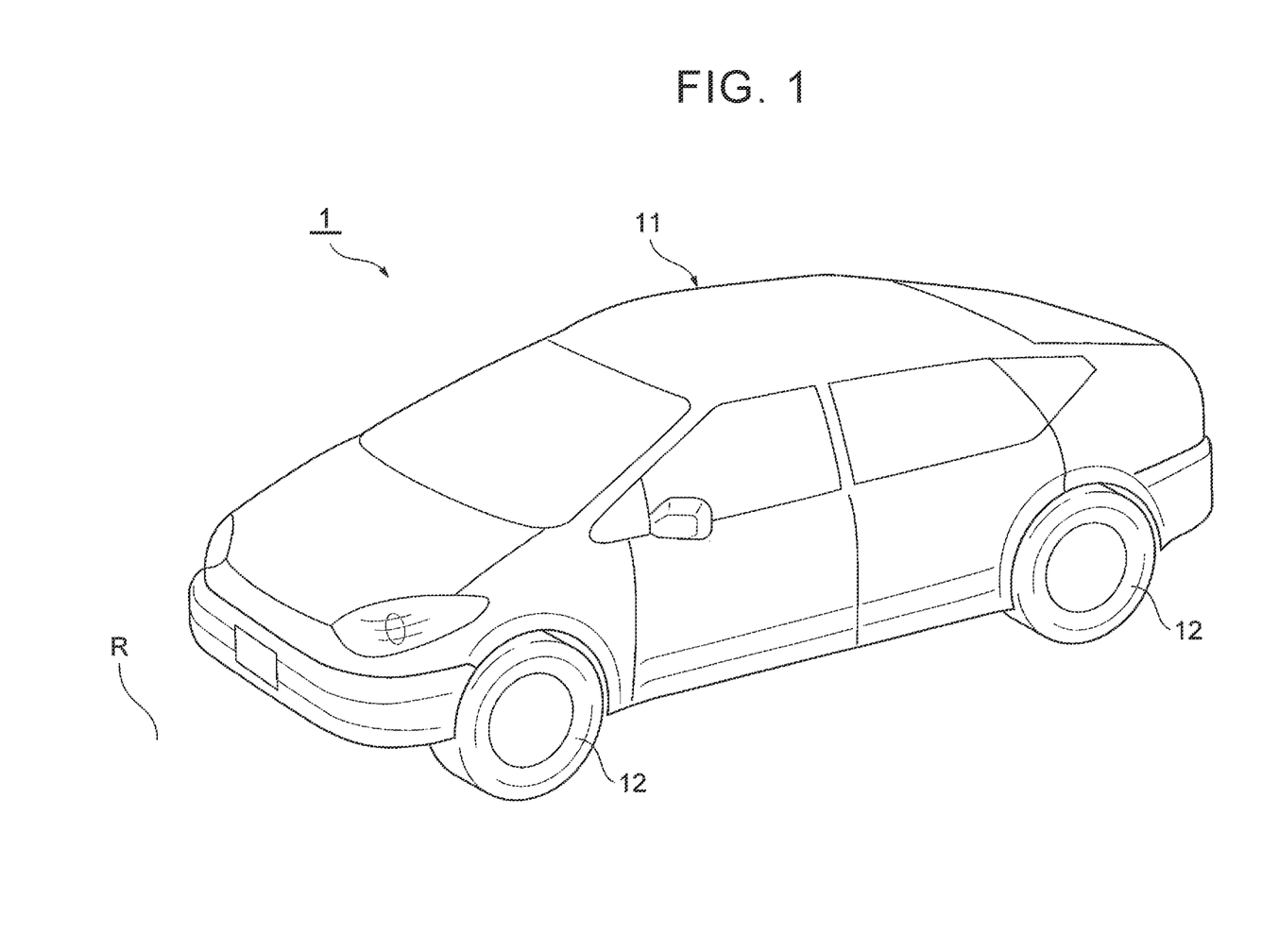
FIG. 1 is a perspective view that shows a vehicle according to an embodiment of the disclosure.
Figure 2:
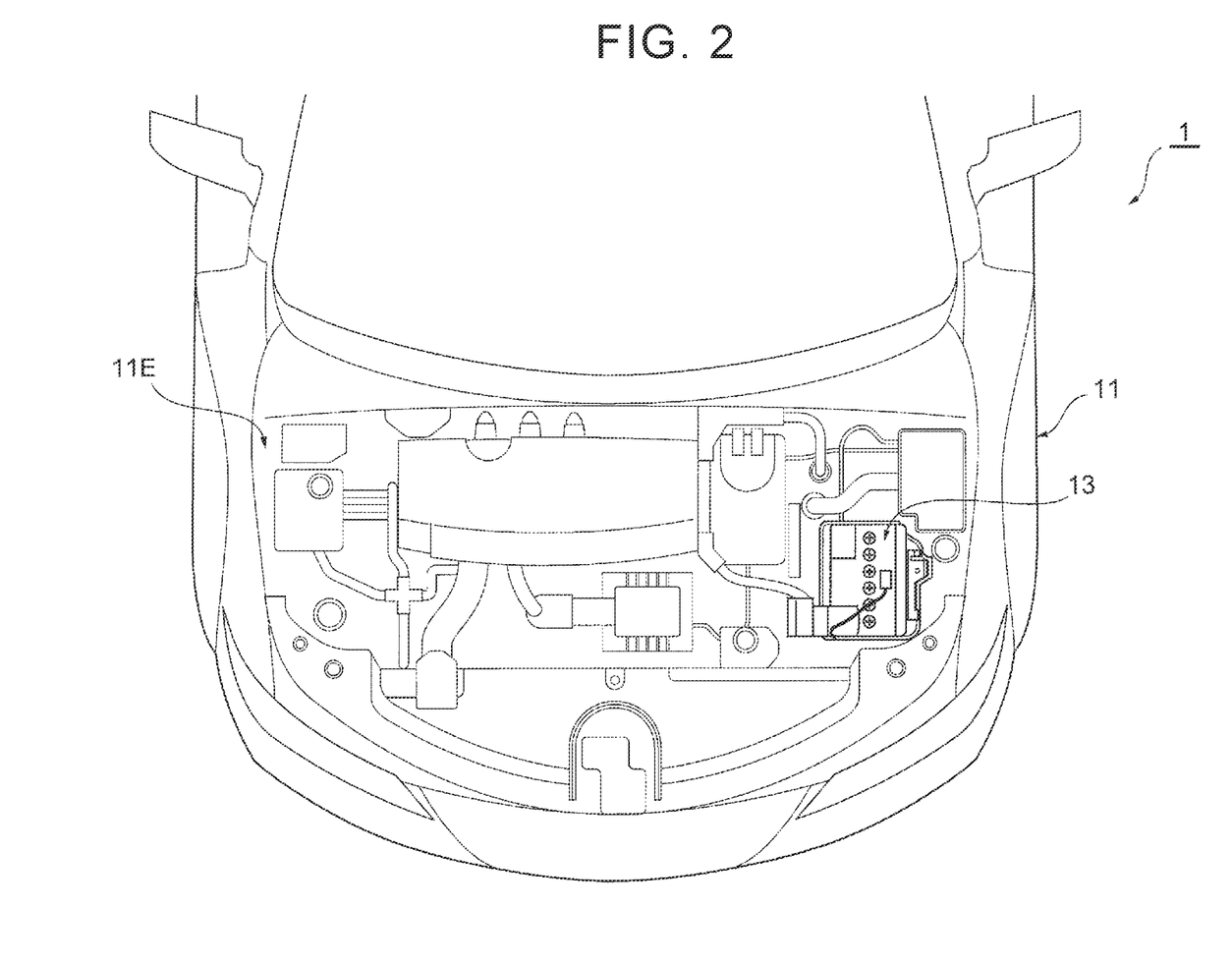
FIG. 2 is a plan view of an engine compartment of the vehicle shown in FIG. 1.
Figure 3:
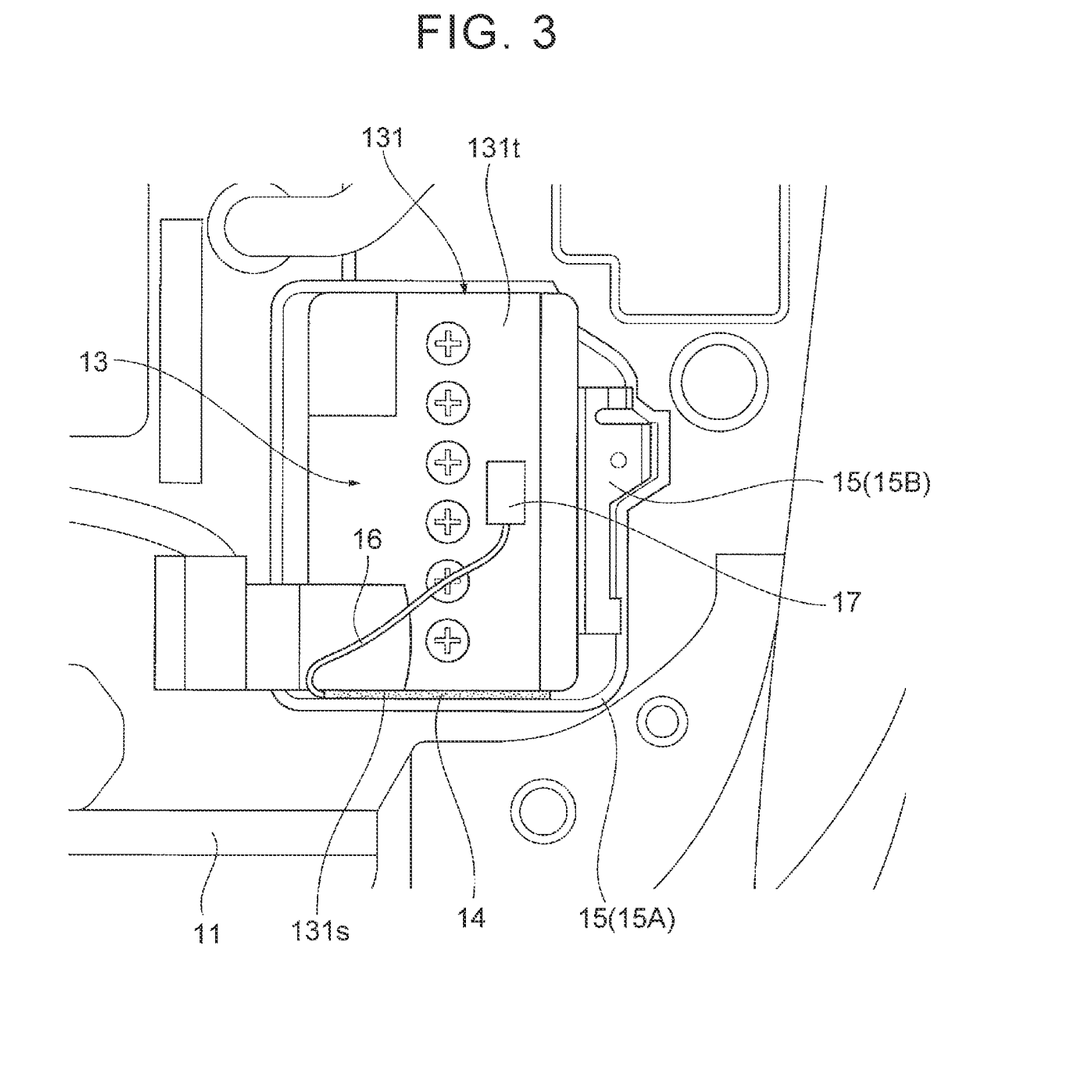
FIG. 3 is an enlarged view of a battery held in the engine compartment of the vehicle shown in FIG. 2.
Figure 4:
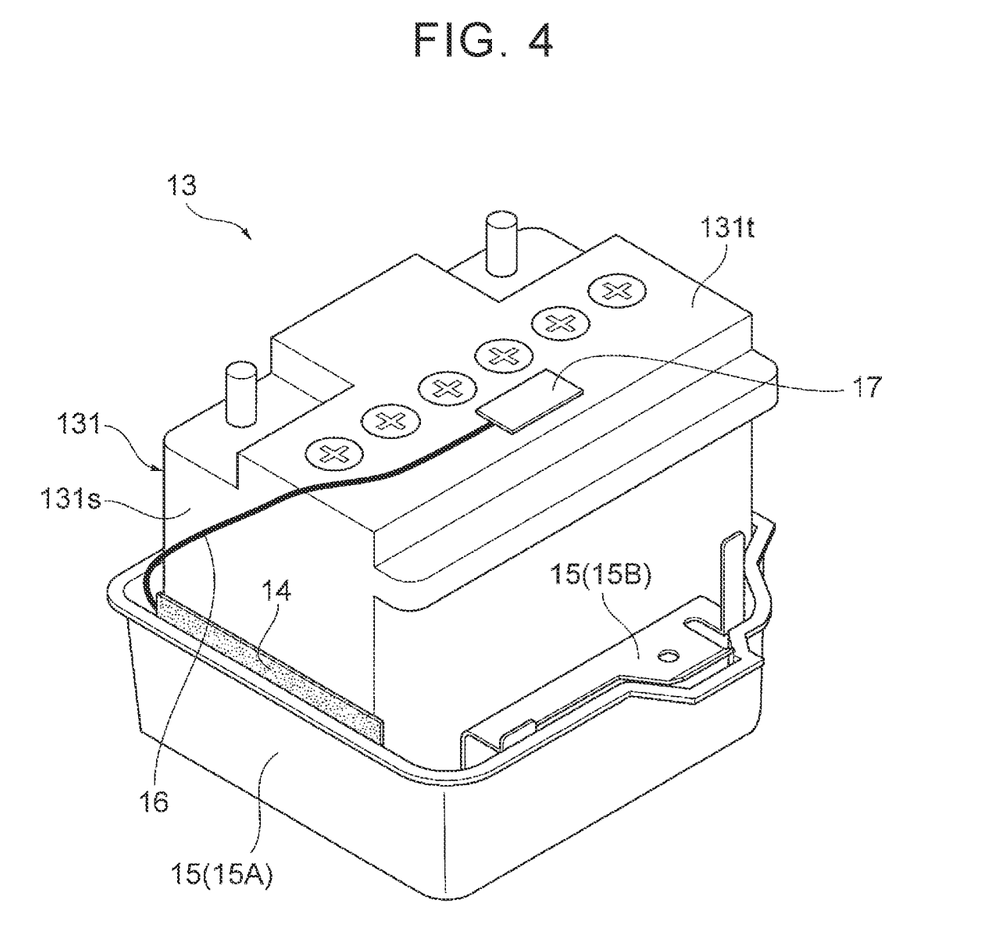
FIG. 4 is a perspective view that shows the battery shown in FIG. 3, and an example of a static eliminator sheet and a holding member.

FIG. 1 is a perspective view that shows the embodiment of the vehicle according to the disclosure. FIG. 2 is a plan view of an engine compartment 11E of a vehicle 1 shown in FIG. 1. FIG. 3 is an enlarged view of a battery 13 held in the engine compartment 11E of the vehicle 1, shown in FIG. 2. FIG. 4 is a perspective view that shows an example of the battery 13, a static eliminator sheet 14, and a holding member 15, shown in FIG. 3.

As shown in FIG. 1, in the vehicle 1 according to the present embodiment, tires 12 having electrical insulating properties are in contact with a road R, with the result that a vehicle body 11 is kept electrically insulated from the road R. Therefore, the vehicle 1 is positively charged with static electricity due to external factors including running of the vehicle body 11, for example, friction between the vehicle body 11 and air, friction between the road R and each of the tires 12, and the like. As will be described in detail later, as shown in FIG. 3 and FIG. 4, the vehicle 1 according to the present embodiment includes the battery 13, the static eliminator sheet 14, and the holding member 15. The vehicle 1 according to the present embodiment further includes a conductor line 16.

The battery 13 is, for example, a 12V lead acid battery. As shown in FIG. 2, the battery 13 is held at a predetermined location in the engine compartment 11E of the vehicle body 11. The battery 13 may be not installed at the rear of the vehicle body 11 in place of the engine compartment 11E. The battery 13 is an auxiliary battery used to supply electric power to various auxiliaries including an electronic control unit that controls, for example, an engine, a brake, a door lock, and the like of the vehicle 1 or to start up a hybrid system of the vehicle 1.

Figure 5:
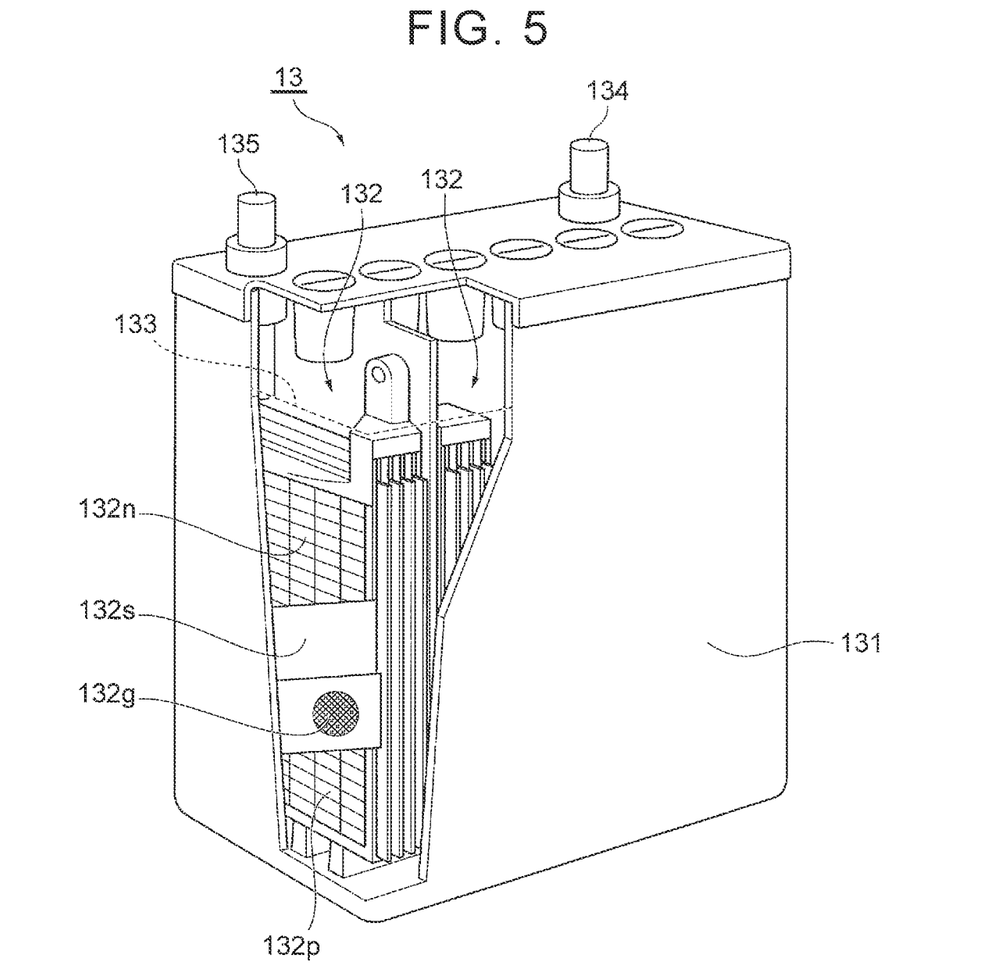
FIG. 5 is a perspective view that shows an example of the configuration of the battery shown in FIG. 3.
Figure 6:
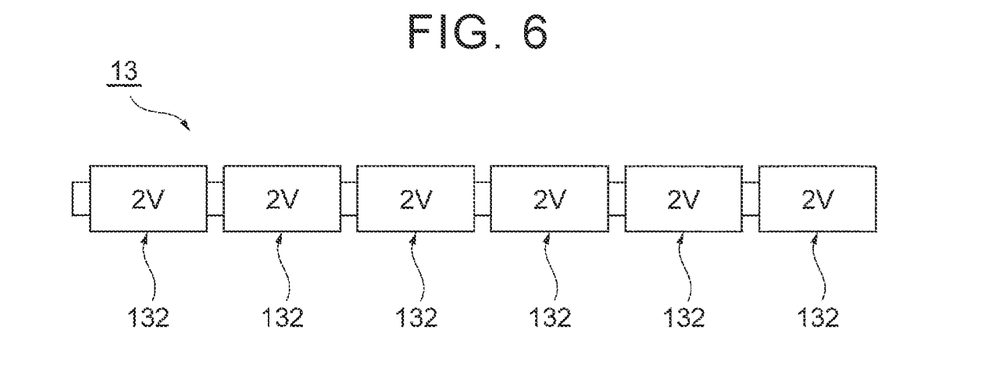
FIG. 6 is a schematic view of a cell structure of the battery shown in FIG. 5.

FIG. 5 is a perspective view that shows an example of the configuration of the battery 13 shown in FIG. 3. FIG. 6 is a schematic view of a cell structure of the battery 13 shown in FIG. 5. The battery 13 includes, for example, a resin case 131, at least one cell 132, an electrolyte 133, a negative terminal 134, and a positive terminal 135. Each cell 132 includes a positive plate 132$p$ and a negative plate 132$n$ opposed via a separator 132$s$. Each cell 132 may include a glass mat 132$g$.

In the example shown in FIG. 5 and FIG. 6, the battery 13 has a cell structure in which the three or more cells 132 are connected in series. More specifically, the battery 13 is, for example, a 12V lead acid battery having a six cell structure in which six 2V cells 132 are connected in series. The resin case 131 accommodates the separator 132$s$, the positive plate 132$p$, and the negative plate 132$n$. Each cell 132 is made up of the separator 132$s$, the positive plate 132$p$, and the negative plate 132$n$. The resin case 131 also accommodates the electrolyte 133. The electrolyte 133 is, for example, dilute sulfuric acid. The electrolyte 133 immerses the separator 132$s$, positive plate 132$p$, and negative plate 132$n$ of each cell 132 inside the resin case 131 and fills a gap between the opposed positive plate 132$p$ and negative plate 132$n$.

The negative terminal 134 is connected to the negative plates 132$n$ of the cells 132 provided in the resin case 131 and is grounded to the vehicle body 11. The positive terminal 135 is connected to the positive plates 132$p$ of the cells 132 provided in the resin case 131 and is supplied with electric power from a charger of the vehicle 1. The charger of the vehicle 1 includes, for example, a converter connected to a generator mounted on the vehicle 1, and an external charging facility to be connected to the vehicle 1. The battery 13 supplies electric power from the positive terminal 135 to auxiliaries of the vehicle 1.

The static eliminator sheet 14 is made of a material on a positive side of a triboelectric series with respect to the material of the resin case 131 of the battery 13. The material of the resin case 131 of the battery 13 is, for example, a resin material, such as polypropylene. When the material of the resin case 131 is polypropylene, examples of the material of the static eliminator sheet 14 include materials on the positive side of the triboelectric series with respect to polypropylene, such as paper, acetate, glass fiber, hemp, cotton, silk, rayon, nylon, and wool.

The static eliminator sheet 14 has, for example, a woven fabric or nonwoven fabric made from fibers of a material on the positive side of the triboelectric series with respect to the material of the resin case 131 of the battery 13. More specifically, the static eliminator sheet 14 is, for example, a woven fabric or nonwoven fabric of cotton. The static eliminator sheet 14 may have, for example, an elastic sheet (described later) in addition to a woven fabric or nonwoven fabric made from fibers of a material on the positive side of the triboelectric series with respect to the material of the resin case 131 of the battery 13.

As shown in FIG. 3 and FIG. 4, the holding member 15 holds the static eliminator sheet 14 and the resin case 131 of the battery 13 in contact with each other. The holding member 15 holds the battery 13 at the predetermined location of the vehicle body 11 in a state where the resin case 131 and the static eliminator sheet 14 are slidable due to vibrations of the vehicle body 11. In the example shown in FIG. 3 and FIG. 4, the holding member 15 includes a catch pan 15A and a bracket 15B.

The catch pan 15A is, for example, a case made of a resin and having elasticity. The catch pan 15A is fixed to the vehicle body 11 and accommodates the lower part of the resin case 131 of the battery 13. The bracket 15B is disposed between the catch pan 15A and the resin case 131 of the battery 13. The static eliminator sheet 14 is, for example, compressed between a side surface 131s of the resin case 131 and a peripheral wall of the catch pan 15A provided to surround the lower part of the resin case 131 and sandwiched in an elastically deformed state. The static eliminator sheet 14 is held in contact with the side surface 131s of the resin case 131.

The conductor line 16, for example, electrically connects the static eliminator sheet 14 with the center of a top surface (131t) that is the outer surface of the resin case 131, corresponding to the location of the cells 132 at the center of the cell structure of the battery 13. Here, the cells 132 at the center of the cell structure of the battery 13 are, in the case of a six cell structure in which the battery 13 includes six cells 132, two cells 132 between the pairs of two cells 132 located at each end.

More specifically, the conductor line 16 has, for example, an electrical conductor, such as a copper line, and a protective cover having electrical insulating properties and covering the electrical conductor. An electrical conductor exposed from the protective cover at one end of the conductor line 16 is electrically connected to the static eliminator sheet 14, and an electrical conductor exposed from the protective cover at the other end of the conductor line 16 is electrically connected to the top surface 131t that is the outer surface at the center of the resin case 131.

In the example shown in FIG. 3 and FIG. 4, the conductor line 16, for example, electrically connects the static eliminator sheet 14 disposed on the side surface 131s of the resin case 131 with the top surface 131t of the resin case 131. An end of the conductor line 16, connected to the top surface 131t of the resin case 131, is fixed to the top surface 131t of the resin case 131 by an electrically insulating tape 17, such as a vinyl tape. The vehicle 1 does not need to include the conductor line 16 that electrically connects the outer surface of the resin case 131 with the static eliminator sheet 14.

Figure 7:
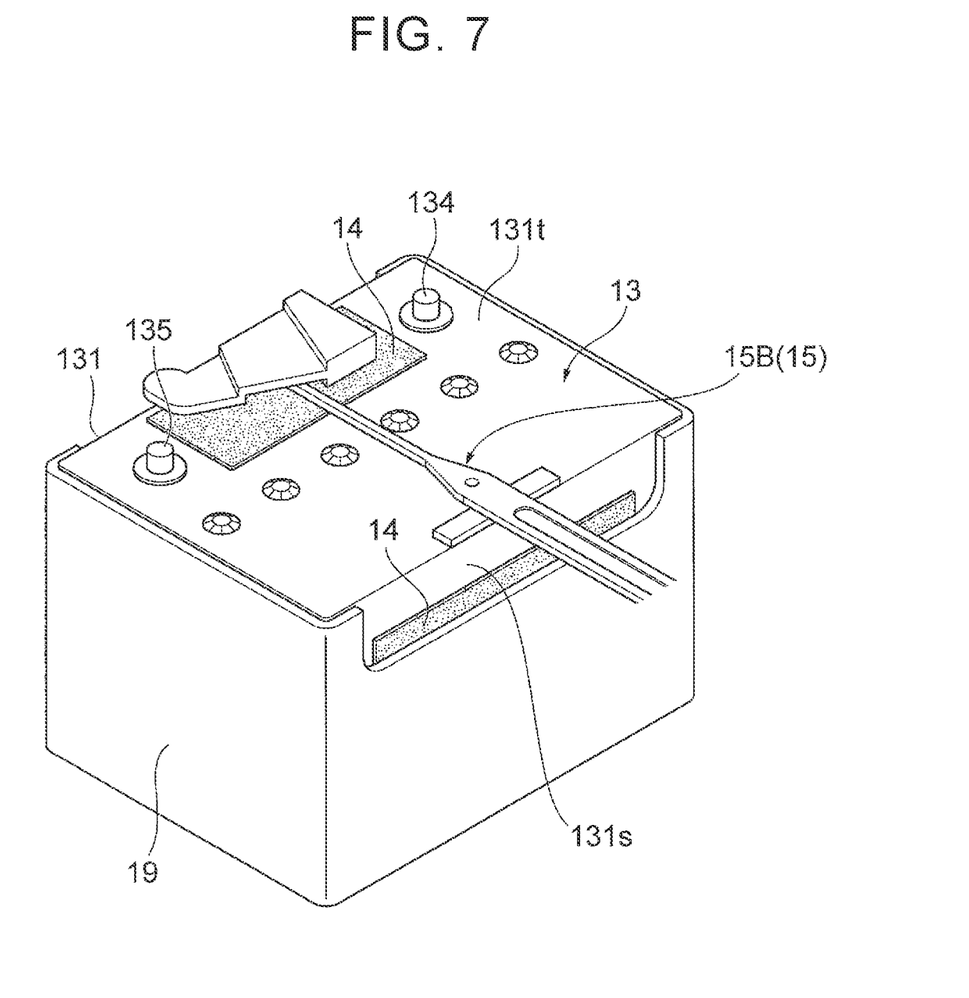
FIG. 7 is a perspective view that shows the battery shown in FIG. 3, and another example of the static eliminator sheet and the holding member.

FIG. 7 is a perspective view that shows the battery 13 and another example of the static eliminator sheets 14 and the holding member 15 according to the present embodiment. In the example shown in FIG. 7, the holding member 15 is made up of the bracket 15B. The battery 13 is accommodated in an insulator 19. The static eliminator sheets 14 are respectively disposed on the top surface 131t and the side surface 131s of the resin case 131 of the battery 13. The bracket 15B holds the static eliminator sheets 14 and the resin case 131 in contact with each other and holds the battery 13 at the predetermined location of the vehicle body 11 in a state where the resin case 131 and each of the static eliminator sheets 14 are slidable on each other due to vibrations of the vehicle body 11.

More specifically, the bracket 15B is, for example, fixed to the vehicle body 11 by a fastening member, such as a bolt, and holds the static eliminator sheet 14 with the top surface 131t of the resin case 131 in a compressed and elastically deformed state. Thus, the bracket 15B brings the static eliminator sheet 14 into contact with the top surface 131t that is the outer surface of the center of the resin case 131 and holds the battery 13 between the battery support surface of the vehicle body 11 and the bracket 15B via the static eliminator sheet 14.

The insulator 19 is, for example, provided so as to surround the resin case 131 of the battery 13 and sandwiches the static eliminator sheet 14 with the side surface 131s of the resin case 131 in an elastically deformed state. Thus, the insulator 19 suppresses a decrease in the temperature of the battery 13, brings the static eliminator sheet 14 and the side surface 131s of the resin case 131 into contact with each other, and holds the resin case 131 and the static eliminator sheet 14 so as to be slidable due to vibrations of the vehicle body 11.

Figure 8:
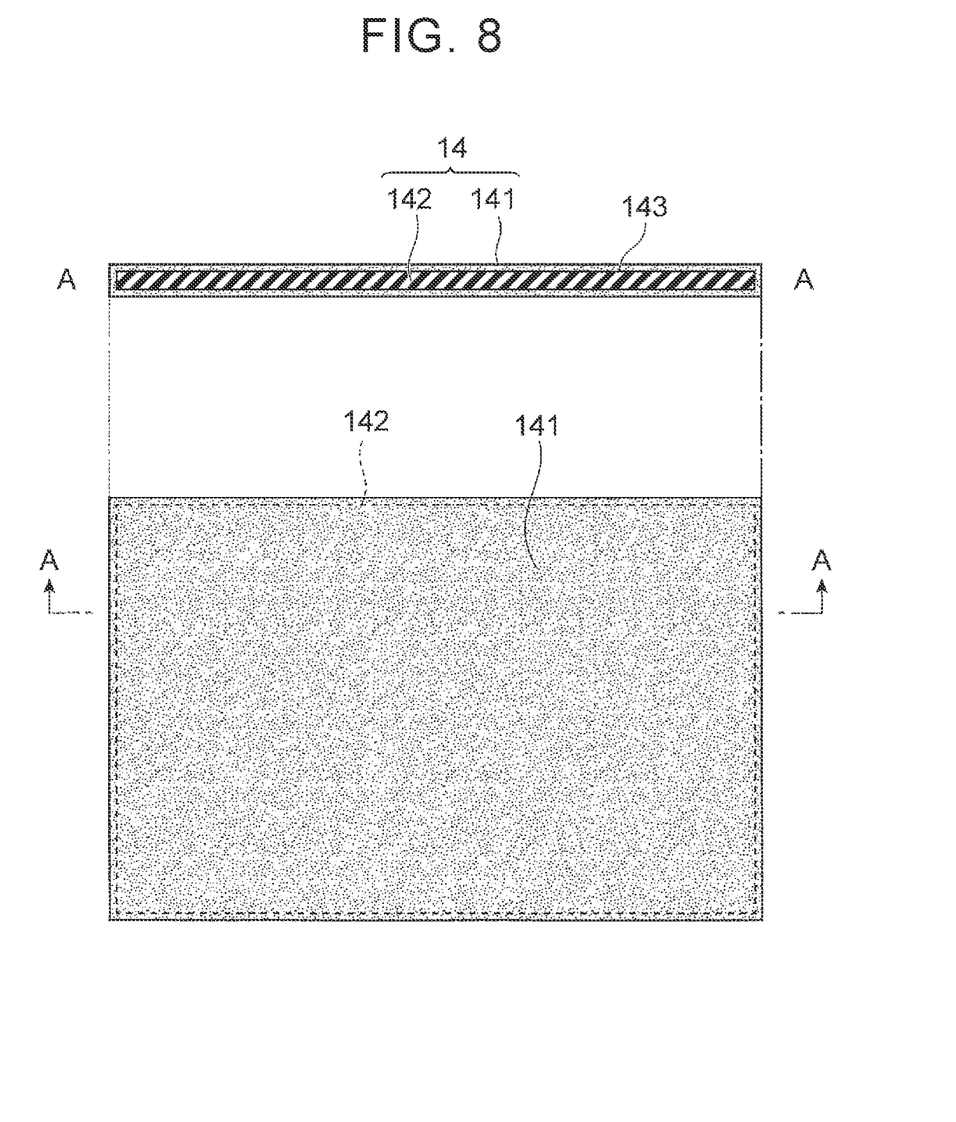
FIG. 8 shows a sectional view and a plan view that show an example of the configuration of the static eliminator sheet shown in FIG. 4 and FIG. 7.

FIG. 8 shows a sectional view and a plan view that show an example of the configuration of the static eliminator sheet 14 shown in FIG. 4 and FIG. 7. The sectional view of the static eliminator sheet 14 shown at the top of FIG. 8 is a sectional view taken along the line A-A in the plan view of the static eliminator sheet 14 shown at the bottom of FIG. 8. In the example shown in FIG. 8, the static eliminator sheet 14 has an elastic sheet 142, and a woven fabric or nonwoven fabric covering the surface of the elastic sheet 142. As described above, examples of the material of the woven fabric or nonwoven fabric 141 include fibers on the positive side of the triboelectric series with respect to the material of the resin case 131 of the battery 13, such as acetate, glass fiber, hemp, cotton, silk, rayon, nylon, and wool.

The material of the elastic sheet 142 is, for example, an antistatic resin, such as an antistatic polypropylene. The electrical resistance value (volume specific resistance) of the antistatic resin is, for example, about $1 \times 10^6$ [Ω·cm] to about $1 \times 10^8$ [Ω·cm] and has properties less likely to be charged with static electricity. The material of the elastic sheet 142 may be, for example, an electrically conductive resin having an electrical resistance value (volume specific resistance) of about $1 \times 10^2$ [Ω·cm] to about $1 \times 10^4$ [Ω·cm]. A tape 143 made of a material on the negative side of the triboelectric series with respect to the material of the woven fabric or nonwoven fabric 141 may be attached to the surface of the elastic sheet 142. For example, polytetrafluoroethylene (PTFE) may be used as the material of the tape 143.

Figure 9:
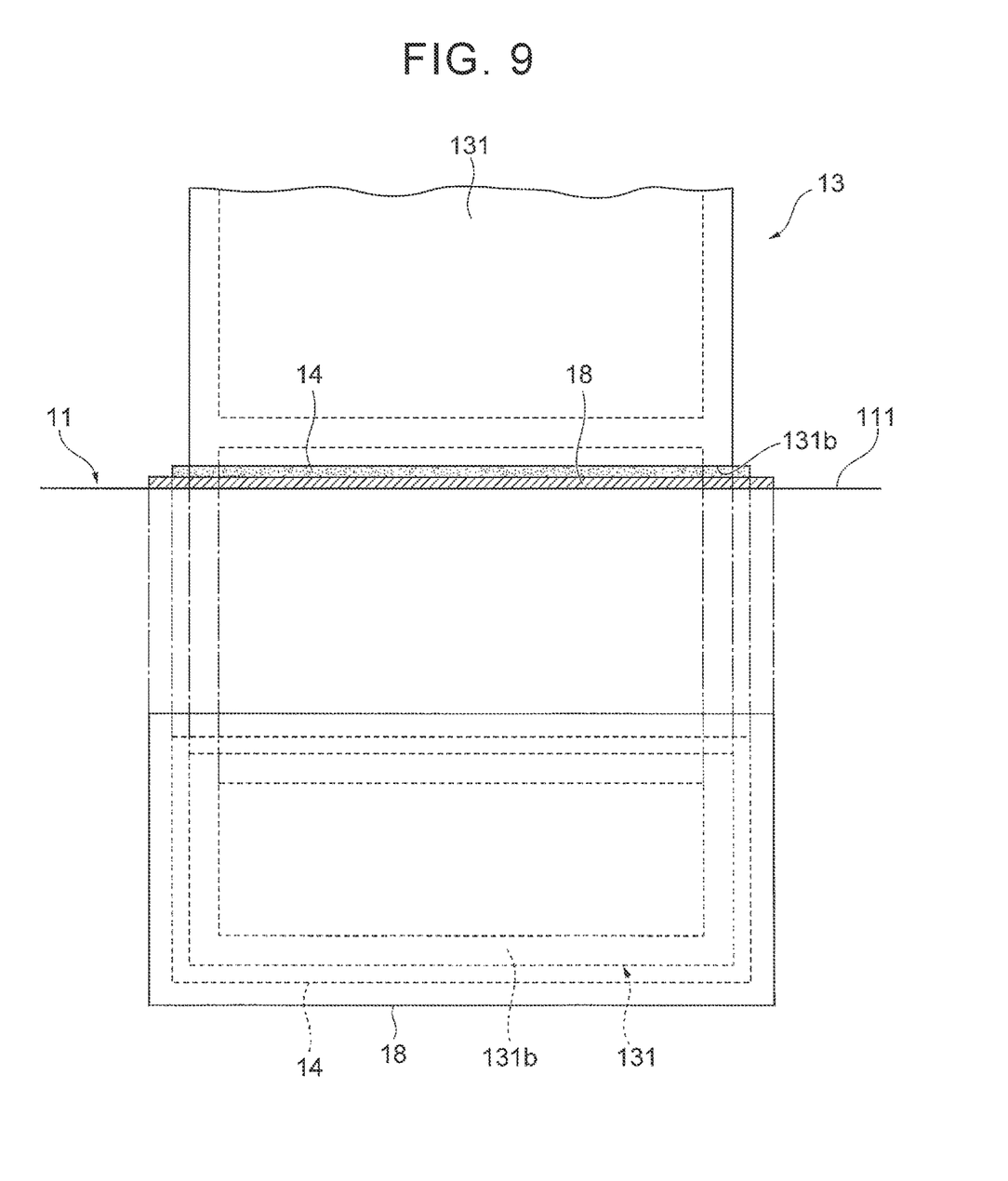
FIG. 9 shows a side view and a bottom view that show another example of arrangement of the battery and the static eliminator sheet, shown in FIG. 4 and FIG. 7.

FIG. 9 shows a side view and a bottom view that show another example of arrangement of the battery 13 and the static eliminator sheet 14 shown in FIG. 4 and FIG. 7. As shown in the side view at the lower part of the battery 13 at the top of FIG. 9, the static eliminator sheet 14 is, for example, supported or fixed on a battery support surface 111 of the vehicle body 11. The battery 13 is placed on the static eliminator sheet 14, and the bottom surface 131b that is the outer surface of the resin case 131 is in contact with the top surface of the static eliminator sheet 14. The static eliminator sheet 14 has a slip resistance 18 on a surface on a side opposite to a surface that is in contact with the resin case 131.

The slip resistance 18 is, for example, an electrically insulating tape, such as a vinyl tape, attached via an adhesion layer to at least one of the static eliminator sheet 14 and the battery support surface 111 of the vehicle body 11. The slip resistance 18 suppresses a slip between the static eliminator sheet 14 and the battery support surface 111. In the present embodiment, the slip resistance 18 is, for example, attached to the battery support surface 111 of the vehicle body 11 via the adhesion layer.

As shown in the bottom view at the bottom of FIG. 9, the bottom surface 131b of the resin case 131 of the battery 13 is provided in a rectangular frame shape having a recess inside. The static eliminator sheet 14 is provided in a range wider than the bottom surface 131b of the resin case 131 having the recess. The static eliminator sheet 14 has an outer edge outside the bottom surface 131b of the resin case 131. The slip resistance 18 is, for example, provided in a range wider than the static eliminator sheet 14. The slip resistance 18 has an outer edge outside the outer edge of the static eliminator sheet 14.

Figure 10:
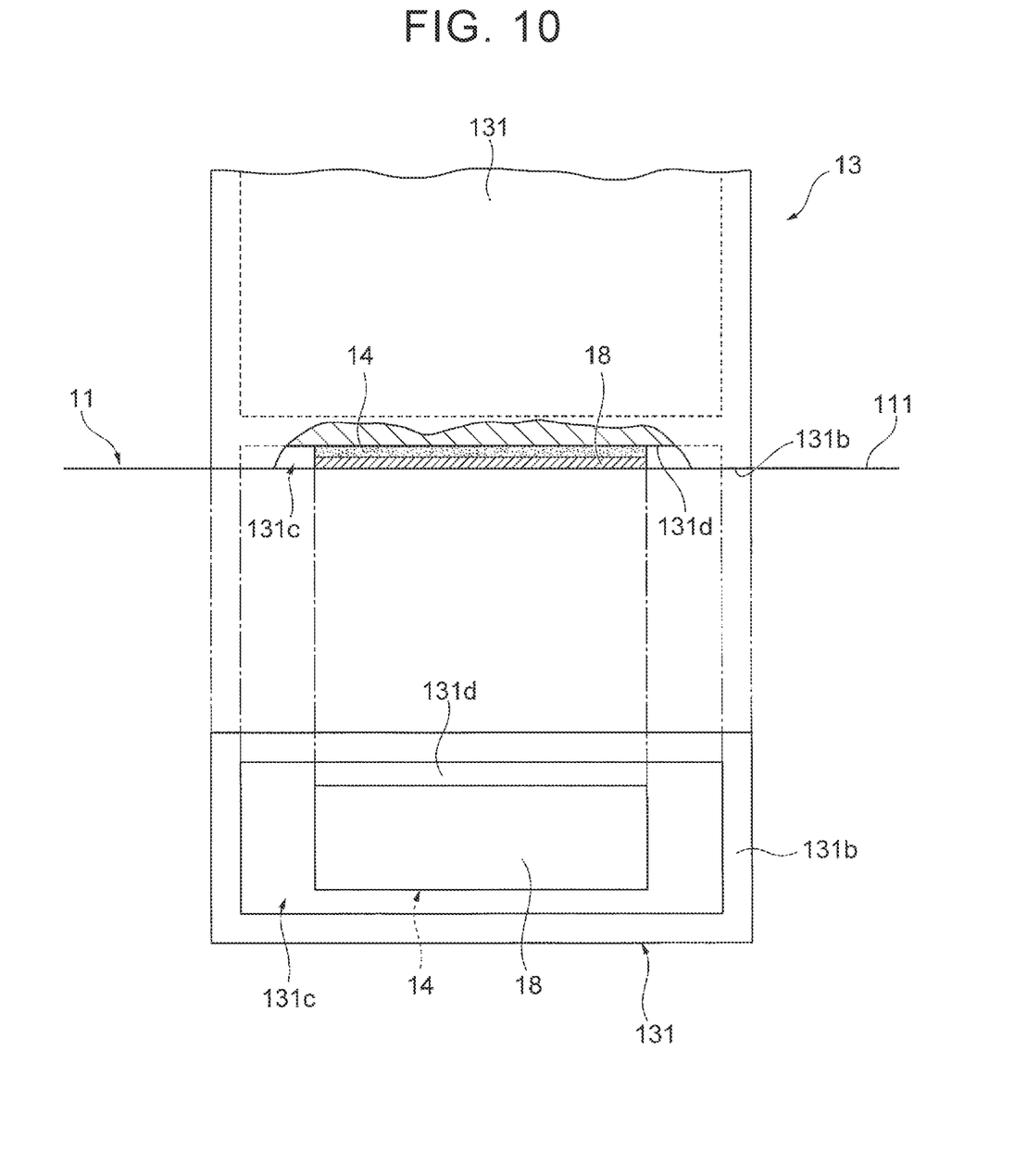
FIG. 10 shows a side view and a bottom view that show another example of arrangement of the battery and the static eliminator sheet shown in FIG. 9.

FIG. 10 shows a side view and a bottom view that show another example of arrangement of the battery 13 and the static eliminator sheet 14 shown in FIG. 9. As shown in the side view of the lower part of the battery 13 with part cut away at the top of FIG. 10, the static eliminator sheet 14 is, for example, disposed inside a recess 131c having a rectangular shape in plan view, provided on a part other than the frame-shaped outer edge of the bottom surface 131b of the resin case 131. The static eliminator sheet 14 is, for example, held between a bottom wall 131d of the recess 131c of the resin case 131 and the slip resistance 18 disposed on the battery support surface 111 of the vehicle body 11 in a compressed and elastically deformed state and is in slidable contact with the bottom wall 131d of the recess 131c. The bottom wall 131d is part of the outer surface of the resin case 131.

Hereinafter, the operation of the vehicle 1 according to the present embodiment will be described.

As described above, in the vehicle 1 according to the present embodiment, the tires 12 having electrical insulating properties are in contact with the road R, with the result that the vehicle body 11 is kept electrically insulated from the road R. Therefore, the vehicle 1 is positively charged with static electricity due to external factors including running of the vehicle body 11, for example, friction between the vehicle body 11 and air, friction between the road R and each of the tires 12, and the like.

In an existing vehicle without the static eliminator sheet 14, when a vehicle body is positively charged, a resin case of a battery held at a predetermined location of the vehicle body and a separator accommodated in the resin case are positively charged. When the resin case of the battery and the separator in the resin case are electrically charged, stirring of an electrolyte between a positive plate and a negative plate accommodated in the resin case and opposed via the separator is impaired, so a stratification phenomenon that causes the deterioration of the battery may occur. When the stratification phenomenon occurs, the charge and discharge potential of the battery decreases, so the original performance of the battery may be not exercised.

In the present embodiment as well, the vehicle 1 is positively charged with static electricity due to external factors including running of the vehicle body 11 kept electrically insulated from the road R. However, the vehicle 1 according to the present embodiment includes the battery 13, the static eliminator sheet 14, and the holding member 15. The battery 13 includes at least one cell 132, the electrolyte 133, the resin case 131, the negative terminal 134, and the positive terminal 135 and supplies electric power to auxiliaries of the vehicle 1 from the positive terminal 135. Each cell 132 includes the positive plate 132p and the negative plate 132n opposed via the separator 132s. The resin case 131 accommodates the components of each cell 132 and the electrolyte 133. The negative terminal 134 is connected to the negative plates 132n provided in the resin case 131 and is grounded to the vehicle body 11. The positive terminal 135 is connected to the positive plates 132p provided in the resin case 131 and is supplied with electric power from the charger of the vehicle 1. The static eliminator sheet 14 is made of a material on the positive side of the triboelectric series with respect to the material of the resin case 131. The holding member 15 holds the static eliminator sheet 14 and the resin case 131 in contact with each other and holds the battery 13 at the predetermined location of the vehicle body 11 in a state where the resin case 131 and the static eliminator sheet 14 are slidable on each other due to vibrations of the vehicle body 11.

With the above configuration, if the vehicle body 11 vibrates due to the unevenness of a road, the vibrations of an engine, or the like during running of the vehicle 1, the resin case 131 of the battery 13 and the static eliminator sheet 14, held slidable and in contact with each other by the holding member 15, slide on each other. As described above, the static eliminator sheet 14 is made of a material on the positive side of the triboelectric series with respect to the material of the resin case 131 of the battery 13. Therefore, electrons with negative charge resulting from friction during sliding between the resin case 131 of the battery 13 and the static eliminator sheet 14 transfer from the static eliminator sheet 14 to the resin case 131 of the battery 13.

As a result, the resin case 131 of the battery 13 and the separator 132s inside the resin case 131, which are mounted on the vehicle 1 that is positively charged with static electricity due to external factors and are positively charged when there is no static eliminator sheet 14, is diselectrified to approach a zero potential. Thus, it is possible to suppress a stratification phenomenon by facilitating stirring of the electrolyte between the positive plate 132p and the negative plate 132n that are accommodated in the resin case 131 of the battery 13 and that are opposed via the separator 132s to suppress the degradation of the battery 13. Therefore, with the vehicle 1 according to the present embodiment, it is possible to exercise the original performance of the battery 13 by suppressing a decrease in the charge and discharge potential of the battery 13.

In the vehicle 1 according to the present embodiment, the battery 13 has a cell structure in which the three or more cells 132 are connected in series. The holding member 15 holds the static eliminator sheet 14 and the outer surface, for example, the top surface, the side surface, and the bottom surface, of the resin case 131, corresponding to the location of the cells 132 at the center of the cell structure of the battery 13, in contact with each other.

With the above configuration, in the battery 13 having a cell structure in which the three or more cells 132 are connected in series, the static eliminator sheet 14 allowed to slide while being in contact with the center of the resin case, corresponding to the location of the cells 132 at the center that are more easily electrically charged. Therefore, it is possible to further effectively diselectrify the resin case 131 with the static eliminator sheet 14.

As shown in FIG. 3 to FIG. 6, the vehicle 1 according to the present embodiment further includes, for example, the conductor line 16 that electrically connects the static eliminator sheet 14 with the top surface 131t that is the outer surface of the resin case 131 of the battery 13, corresponding to the location of the cells 132 at the center of the cell structure of the battery 13.

With such a configuration, electrons that transfer from the static eliminator sheet 14 to the resin case 131 due to friction during sliding between the static eliminator sheet 14 and the resin case 131 are supplied via the conductor line 16 to the top surface 131t that is the outer surface of the resin case 131, corresponding to the location of the cells 132 at the center, spaced apart from the static eliminator sheet 14. With this configuration, it is possible to diselectrify positive charge on the top surface 131t of the resin case 131, corresponding to the location of the cells 132 at the center of the cell structure, spaced apart from the static eliminator sheet 14 disposed on the side surface 131s of the resin case 131 and to cause the resin case 131 to approach a zero potential. Therefore, with the vehicle 1 according to the present embodiment, it is possible to suppress a stratification phenomenon by further facilitating stirring of the electrolyte between the positive plate 132p and the negative plate 132n that are accommodated in the resin case 131 and that are opposed via the separator 132s to further effectively suppress the degradation of the battery 13.

In the vehicle 1 according to the present embodiment, for example, as shown in FIG. 8, the static eliminator sheet 14 has the woven fabric or nonwoven fabric 141 made from fibers of a material on the positive side of the triboelectric series with respect to the material of the resin case 131 of the battery 13.

With the above configuration, it is possible to impart flexibility and elasticity to the static eliminator sheet 14 and to provide the static eliminator sheet 14 with good slidability against the surface of the resin case 131. Thus, the holding member 15 is capable of holding the static eliminator sheet 14 with the resin case 131 in an elastically compressed state, so it is possible to hold the battery 13 at the predetermined location of the vehicle body 11 in a state where the static eliminator sheet 14 and the resin case 131 are slidable and in contact with each other.

In the example shown in FIG. 9 and FIG. 10, in the vehicle 1 according to the present embodiment, the static eliminator sheet 14 is fixed on the battery support surface 111 of the vehicle body 11. The battery 13 is placed on the static eliminator sheet 14, and the bottom surface 131b of the resin case 131, including the bottom wall 131d of the recess 131c of the resin case 131, is in contact with the top surface of the static eliminator sheet 14.

With the above configuration, the holding member 15 holds the static eliminator sheet 14 and the resin case 131 in a state where the top surface of the static eliminator sheet 14 fixed on the battery support surface 111 of the vehicle body 11 and the bottom surface 131b or the bottom wall 131d of the recess 131c of the resin case 131 are in contact with each other. The holding member 15 also allows sliding between the top surface of the static eliminator sheet 14 and the bottom surface 131b of the resin case 131 due to vibrations of the vehicle body 11. Thus, the resin case 131 is caused to approach a zero potential by sliding the top surface of the static eliminator sheet 14 and the bottom surface 131b or the bottom wall 131d of the recess 131c of the resin case 131 on each other during vibrations of the vehicle body 11 and diselectrifying positive charge of the resin case 131 by supplying electrons from the top surface of the static eliminator sheet 14 to the bottom surface 131b or the bottom wall 131d of the recess 131c of the resin case 131.

As in the case of the example shown in FIG. 7, in the vehicle 1 according to the present embodiment, the static eliminator sheet 14 may be, for example, disposed on the top surface 131t of the center of the resin case 131, corresponding to the location of the cells 132 at the center of the cell structure. In this case, the holding member 15 includes, for example, the bracket 15B that brings the static eliminator sheet 14 into contact with the top surface 131t of the center of the resin case 131 and holds the battery 13 between the battery support surface 111 of the vehicle body 11 and the bracket 15B via the static eliminator sheet 14.

With such a configuration, the holding member 15 holds the static eliminator sheet 14 and the resin case 131 in a state where the static eliminator sheet 14 and, for example, the top surface 131t of the center of the resin case 131 are brought into contact with each other by the bracket 15B. The bracket 15B holds the battery 13 between the battery support surface 111 of the vehicle body 11 and the bracket 15B via the static eliminator sheet 14. Thus, it is possible to hold the battery 13 at the predetermined location of the vehicle body 11 in a state where the top surface 131t of the resin case 131 and the static eliminator sheet 14 are slidable on each other due to vibrations of the vehicle body 11.

As in the case of the example shown in FIG. 9 and FIG. 10, in the vehicle 1 according to the present embodiment, the static eliminator sheet 14 may have the slip resistance 18 on the surface on the side opposite to the surface that is in contact with the resin case 131.

With such a configuration, it is possible to suppress a relative displacement between the static eliminator sheet 14 and the vehicle body 11 during vibrations of the vehicle body 11 and to further effectively slide the static eliminator sheet 14 and the resin case 131 on each other. Thus, it is possible to further effectively supply electrons from the static eliminator sheet 14 to, for example, the center of the resin case 131, corresponding to the location of the cells 132 at the center of the cell structure of the battery 13, during vibrations of the vehicle body 11. Therefore, it is possible to cause the entire battery 13 having at least one cell 132 to approach a zero potential uniformly by diselectrifying the center of the resin case 131 of the battery 13 and the separator in the resin case 131, which are to be charged with a higher positive potential when there is no static eliminator sheet 14.

As in the case of the example shown in FIG. 8, in the vehicle 1 according to the present embodiment, the static eliminator sheet 14 may have the elastic sheet 142, and the woven fabric or nonwoven fabric 141 covering the surface of the elastic sheet 142.

With the above configuration, the flexible woven fabric or nonwoven fabric 141 made from fivers of the material on the positive side of the triboelectric series with respect to the material of the resin case 131 of the battery 13 is supported by the elastic sheet 142 having a certain stiffness, with the result that the shape of the static eliminator sheet 14 is stabilized. When the static eliminator sheet 14 and the resin case 131 are held by the holding member 15 in contact with each other, it is possible to elastically deform the elastic sheet 142 between the holding member 15 and the resin case 131. Thus, the holding member 15 is capable of holding the battery 13 at the predetermined location of the vehicle body 11 in a state where the woven fabric or nonwoven fabric 141 and the resin case 131 are slidable on each other by pressing the woven fabric or nonwoven fabric 141 covering the surface of the elastic sheet 142 against the resin case 131 with the elastic force of the elastic sheet 142.

In the vehicle 1 according to the present embodiment, the material of the elastic sheet 142 may be an antistatic resin.

With the above configuration, electrical charge of the elastic sheet 142 caused by static electricity resulting from friction between the elastic sheet 142 and the woven fabric or nonwoven fabric 141 covering the surface of the elastic sheet 142 is suppressed. Therefore, in a state where the woven fabric or nonwoven fabric 141 covering the surface of the elastic sheet 142 is pressed against the resin case 131 of the battery 13 by the elastic force of the elastic sheet 142, the woven fabric or nonwoven fabric 141 and the resin case 131 are caused to slide on each other. Therefore, it is possible to efficiently supply electrons from the woven fabric or nonwoven fabric 141 to the resin case 131, so it is possible to further efficiently diselectrify the resin case 131 of the battery 13 and the separator in the resin case 131, which are positively charged when there is no static eliminator sheet 14, and to cause the resin case 131 and the separator to approach a zero potential.

In the vehicle 1 according to the present embodiment, the tape 143 made of a material on the negative side of the triboelectric series with respect to the material of the woven fabric or nonwoven fabric 141 may be attached to the surface of the elastic sheet 142. With the above configuration, electrons that occur in the static eliminator sheet 14 increase, and it is possible to further effectively dielectrify the resin case 131 of the battery 13 that is positively charged and to cause the resin case 131 to approach a zero potential.

As described above, according to the present embodiment, it is possible to provide the vehicle 1 capable of suppressing the deterioration of the battery 13 by suppressing a stratification phenomenon by facilitating stirring of the electrolyte between the positive plate 132$p$ and the negative plate 132$n$ that are accommodated in the resin case 131 of the battery 13 that supplies electric power to auxiliaries of the vehicle 1 and that are opposed via the separator 132$s$ and exercising the original performance of the battery 13.

The embodiment of the vehicle according to the disclosure has been described in detail with reference to the accompanying drawings; however, the specific configuration is not limited to the embodiment. The disclosure encompasses design changes and the like within the range without departing from the scope of the disclosure.

What is claimed is:

1. A vehicle that is positively charged with static electricity due to an external factor including running of a vehicle body kept electrically insulated from a road, the vehicle comprising:
a battery including at least one cell having a positive plate and a negative plate opposed via a separator, an electrolyte, a resin case accommodating the at least one cell and the electrolyte, a negative terminal provided on the resin case so as to be connected to the negative plate and grounded to the vehicle body, and a positive terminal provided on the resin case so as to be connected to the positive plate and configured to supply electric power from a charger of the vehicle, the battery being configured to supply electric power to an auxiliary of the vehicle from the positive terminal;
a static eliminator sheet made of a material on a positive side of a triboelectric series with respect to a material of the resin case; and
a holding member holding the static eliminator sheet and the resin case in contact with each other and holding the battery at a predetermined location of the vehicle body in a state where the resin case and the static eliminator sheet are slidable due to vibrations of the vehicle body.

2. The vehicle according to claim 1, wherein:
the battery has a cell structure in which three or more cells are connected in series; and
the holding member holds the resin case and the static eliminator sheet in a state where part of an outer surface of the resin case, corresponding to a location of the cell at a center of the cell structure, is in contact with the static eliminator sheet.

3. The vehicle according to claim 1, wherein:
the battery has a cell structure in which three or more cells are connected in series; and
the vehicle further comprising a conductor line electrically connecting the static eliminator sheet with part of an outer surface of the resin case, corresponding to a location of the cell at a center of the cell structure.

4. The vehicle according to claim 1, wherein the static eliminator sheet has a woven fabric or nonwoven fabric made from fibers of the material on the positive side of the triboelectric series with respect to the material of the resin case.

5. The vehicle according to claim 4, wherein:
the static eliminator sheet is fixed on a battery support surface of the vehicle body; and
the battery is placed on the static eliminator sheet, and a bottom surface of the resin case is in contact with a top surface of the static eliminator sheet.

6. The vehicle according to claim 4, wherein:
the static eliminator sheet is disposed on a top surface of the resin case; and
the holding member includes a bracket that brings the static eliminator sheet into contact with the top surface of the resin case and that holds the battery between a battery support surface of the vehicle body and the bracket via the static eliminator sheet.

7. The vehicle according to claim 4, wherein the static eliminator sheet has a slip resistance on a surface on a side opposite to a surface that is in contact with the resin case.

8. The vehicle according to claim 4, wherein the static eliminator sheet has an elastic sheet and the woven fabric or nonwoven fabric covering a surface of the elastic sheet.

9. The vehicle according to claim 8, wherein a material of the elastic sheet is an antistatic resin.

10. The vehicle according to claim 8, wherein a tape made of a material on a negative side of the triboelectric series with respect to the material of the woven fabric or nonwoven fabric is attached to the surface of the elastic sheet.

* * * * *